United States Patent [19]

Ohnishi et al.

[11] Patent Number: 5,095,332
[45] Date of Patent: Mar. 10, 1992

[54] DATA PROCESSING APPARATUS PROVIDED IN COPYING MACHINE

[75] Inventors: Kazuyuki Ohnishi, Nara; Kiyoshi Inamoto, Sakai; Masato Tokishige, Nara; Takeshi Takarada, Tenri, all of Japan

[73] Assignee: Diafoil Company, Limited, Tokyo, Japan

[21] Appl. No.: 686,411

[22] Filed: Feb. 25, 1991

[30] Foreign Application Priority Data

Mar. 2, 1990 [JP] Japan ................................. 2-52282

[51] Int. Cl.⁵ ............................................ G03G 15/00
[52] U.S. Cl. ...................................... 355/204; 364/187
[58] Field of Search ....................... 355/202, 204–207, 355/209; 358/401, 439; 364/187; 365/94

[56] References Cited

U.S. PATENT DOCUMENTS 4,441,164 4/1984 Pavan et al. ...................... 365/94 X
4,987,447 1/1991 Ojha .................................. 355/204

FOREIGN PATENT DOCUMENTS 62-255965 11/1987 Japan .
63-02034 1/1988 Japan ................................. 355/204
2-8864 1/1990 Japan ................................. 355/204
2-238470 9/1990 Japan ................................. 355/204

Primary Examiner—Joan H. Pendegrass
Attorney, Agent, or Firm—David G. Conlin; Ernest V. Linek

[57] ABSTRACT

A data processing apparatus provided in a copying machine is provided for eliminating the need for replacing the data such as adjusting values in case of replacing a memory board in the copying machine. The data processing apparatus provided in a copying machine which is used when a first memory for storing electrical signals indicative of adjusting values needed in operation of the copying machine is replaced by a second memory, the data processing apparatus includes means for printing-out on a sheet image informations representative of the adjusting values stored in the first memory, means for reading the image informations on the sheet, and means for converting the read image informations to electrical signals indicative of adjusting values and for storing the converted electrical signals in the second memory.

10 Claims, 4 Drawing Sheets

DATA PROCESSING APPARATUS PROVIDED IN COPYING MACHINE

BACKGROUND OF THE INVENTION

1. Field of the Invention

The present invention relates to a data processing apparatus for converting image informations representative of adjusting values stored in a memory in a copying machine, which are printed out, to electrical signals of the adjusting values and for inputting the converted electrical signals to another memory. More particularly, the invention relates to the data processing apparatus which is mainly used when a memory board in the copying machine is replaced.

2. Description of the Related Art

A copying machine includes several processing units suitably controlled on corresponding adjusting values. These adjusting values are specific to each copying machine. For example, an applied voltage when a photoconductor is charged, is variable to a degree in each copying machine, because each copying machine has the corresponding photoconductor. The adjusting values are used for averaging the variety. There are some kinds of adjusting values except the above voltage. Data of adjusting values are stored in a memory (RAM (Random Access Memory)) as electrical signals and are picked out of it in need.

Consider that some failure takes place in a memory board on which the memory storing the data of the adjusting values is arranged. In this case, the memory board needs to be replaced. For the replacement, with the known technique, the data of the adjusting values are temporarily printed out so that an operator can input those data in a new memory board manually.

Today, however, the copying machine keeps more functions, thereby keeping more data of the adjusting values accordingly. As a result, the operator needs a lot of toil for manually inputting all data of the adjusting values printed on a paper. The inputting mistakes are more likely to occur when inputting data of the adjusting values.

SUMMARY OF THE INVENTION

It is therefore an object of the present invention to provide a data processing apparatus which is constructed to allow the printed image informations representative of the adjusting values stored in a memory to be automatically input to another memory as electrical signals for the purpose of preventing toil and inputting mistakes entailed by the manual input.

The object of the invention can be achieved by a data processing apparatus provided in a copying machine which is used when a first memory for storing electrical signals indicative of adjusting values needed in operation of the copying machine is replaced by a second memory, the data processing apparatus including means for printing-out on a sheet image informations representative of the adjusting values stored in the first memory, means for reading the image informations on the sheet, and means for converting the read image informations to electrical signals indicative of adjusting values and for storing the converted electrical signals in the second memory.

In operation, the data processing apparatus served to read image informations representative of the adjusting values printed on a sheet and convert the read image informations to electrical signals indicative of the adjusting values. For example, with the printing-out means for printing out the image informations representative of the adjusting values whose data are stored in a memory, the image informations are printed on a sheet in mark-sheet fashion and the marks are read out as the numeric values for converting them. When, therefore the memory board containing the memory is replaced, the image informations printed out on the sheet are allowed to be read and converted to electrical signals indicative of the adjusting values and the converted electrical signals are stored in another memory without manually inputting. It results in being able to prevent the toil and inputting mistakes entailed by the manual data input.

Further objects and advantages of the present invention will be apparent from the following description of the preferred embodiment of the invention as illustrated in the accompanying drawings.

DESCRIPTION OF THE PREFERRED EMBODIMENTS

Figure 1:
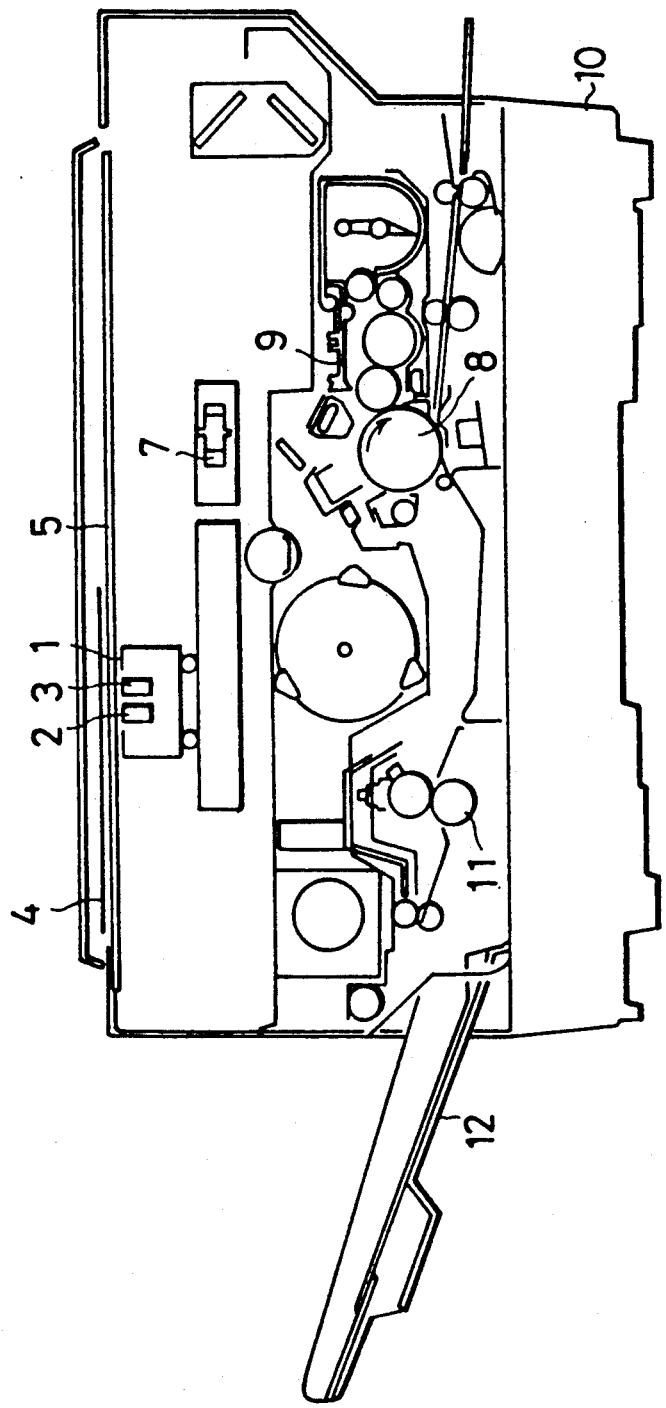
FIG. 1 is a schematic elevation showing a copying machine providing a data processing apparatus according to the invention.

FIG. 1 is a schematic elevation showing a digital copying machine providing a data processing apparatus.

5 denotes a plate for setting an original, made of a transparent hard glass material. As shown, the plate 5 is provided on the top of the copying machine. Under the plate 5, there is located a scanning unit 1 having a light-emitting diode (LED) array 3 and a charge-coupled device (CCD) array 2. The scanning unit 1 travels along the plate 5 for image-reading an original 4 placed on the plate 5. With the travel of the scanning unit 1, the LED array 3 applies light to the original 4 and the CCD array 2 detects the light reflected from the original 4. The read image data are stored in an image RAM (to be described later). In the normal copying operation, a proper image process (hatching or trimming, for instance) is carried out for the image data stored in the image RAM. Then, the resulting image data are sent to a laser unit 7. The laser unit 7 applies a laser beam matching to the image data to a photoconductor 8, thereby allowing an electrostatic latent image to be formed on the photoconductor 8. Then, a developing device 9 serves to adhere toner to the photoconductor 8 depending on the electrostatic latent image. The toner image is transferred to a sheet of paper conveyed from a paper cassette 10. The image-formed sheet is fixed by a fixer 11 and then is ejected to a paper tray 12 located on the left side of the copying machine.

Figure 2:
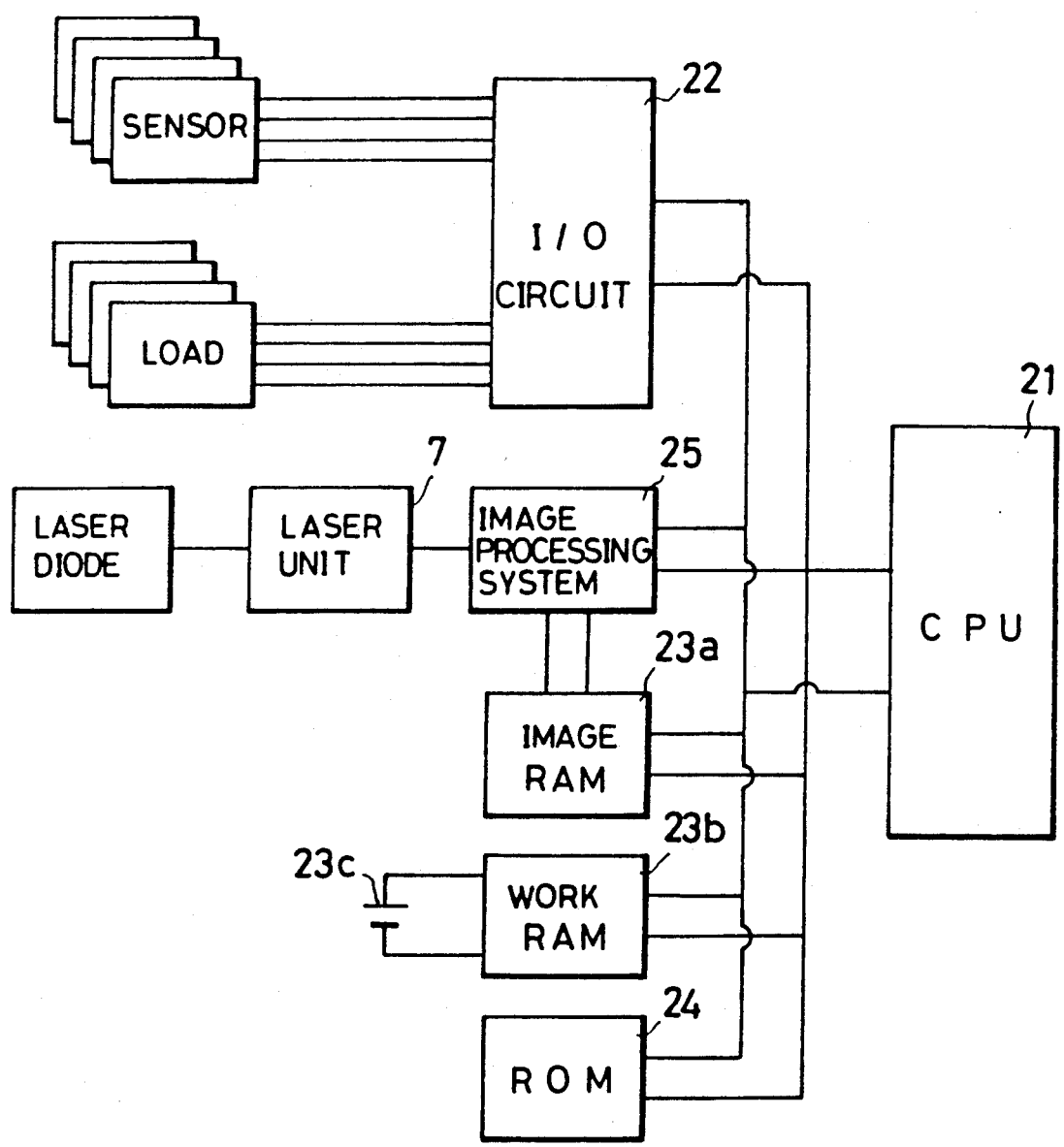
FIG. 2 is a block diagram showing an essential portion of the copying machine providing a data processing apparatus according to the invention.

FIG. 2 is a block diagram showing an essential portion of the copying machine.

21 denotes a central processing unit (CPU) which is connected to an image RAM 23a, a work RAM 23b, a ROM (Read Only Memory) 24, and an image processing system 25. The CPU 21 is, further, connected to various sensors, a manipulation panel and the like through an I/O (Input/Output) circuit 22. The work RAM 23b is backed up by a backup power source 23c and stores the adjusting values used for controlling the copying machine. The image RAM 23a stores the image data read in the scanning unit 1.

In the normal copying operation, the image data read by the scanning unit 1 is stored in the image RAM 23a. A proper image process (hatching or trimming) is carried out for the image data stored in the image RAM 23a. Then, the resulting image data are sent to the laser unit 7. The laser unit 7 transfers the resulting image data to a laser beam and applies the laser beam to the photoconductor 8, thereby allowing an electrostatic latent image to be formed on the photoconductor 8. The adjusting values concern with a charging voltage of the photoconductor and a developing bias voltage, for example, which are specific to each copying machine. These adjusting values stored in the work RAM 23b are used during the above forming the image.

For replacing a memory board containing the work RAM 23b, the following process is carried out. As the memory board to be replaced is left attached, the data such as the adjusting values stored in the work RAM 23b are printed out as image informations. The example of the printed image informations representative of the adjusting values are illustrated in FIG. 3.

Figure 3:
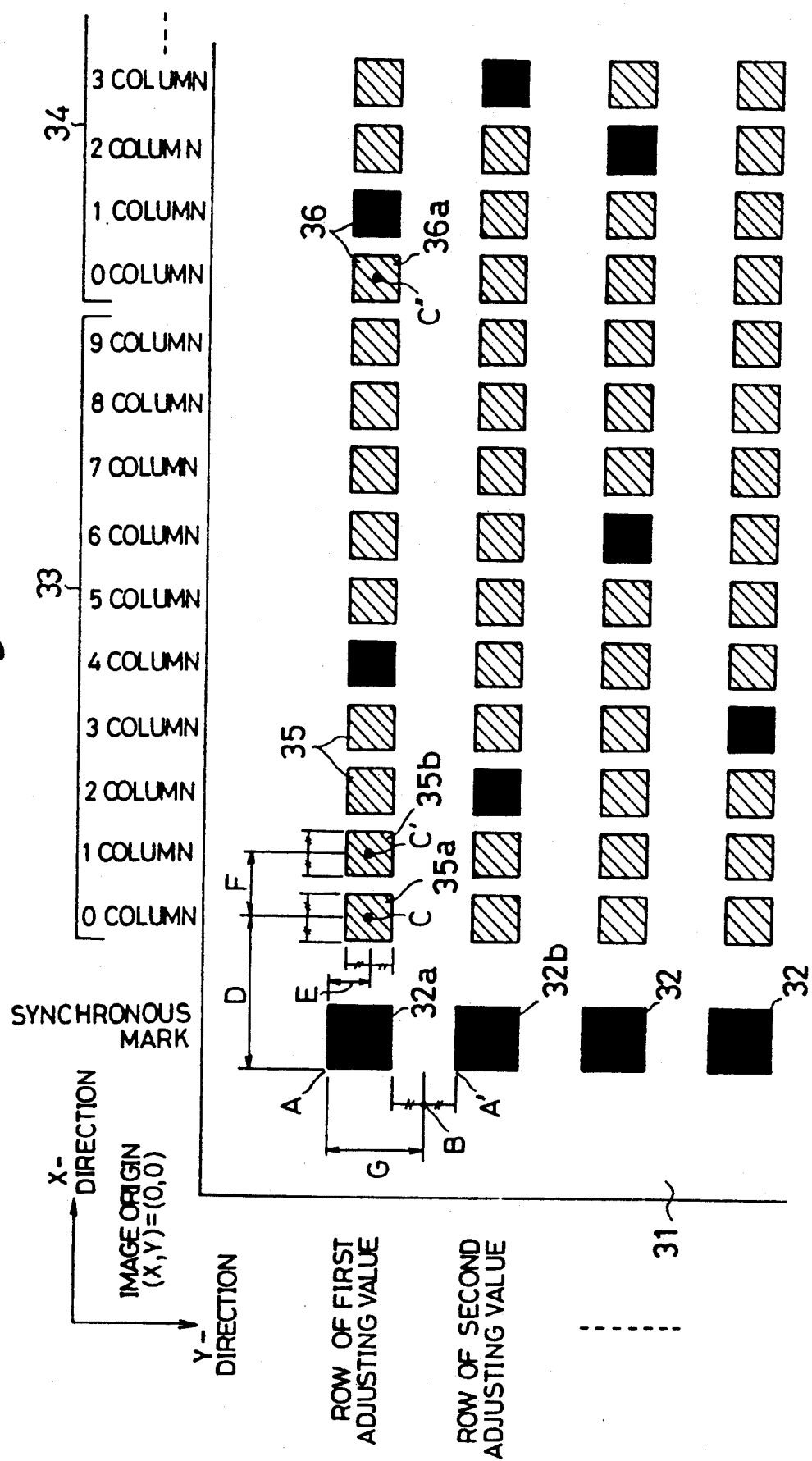
FIG. 3 is a view showing a format of image informations printed on a sheet.

As shown in FIG. 3, the image informations representative of the adjusting values are represented in two-digit decimal notation. Those informations are marked in black in mark-sheet fashion. On a printed-out sheet 31, the two-digit decimal notation representing the adjusting values consists of a synchronous mark 32 located at the head, a mark portion of an upper-digit numerical value 33 and a mark portion of a lower-digit numerical value 34 ranged horizontally, that is, in the x-direction after the synchronous mark 32. The mark portions of an upper-digit and a lower-digit numerical value 33 and 34 respectively provide 0 to 9 numerical portions 35 and 36. The numerical portions corresponding to the adjusting values are marked in black for the purpose of representing the adjusting values. The numerical portions 35 and 36 are ranged vertically, that is, in the y-direction. The number of the numerical portions 35 and 36 marked in black are the same as that of the necessary adjusting values. For example, the first adjusting value is 41, the second adjusting value is 23, and so forth. In FIG. 3, the oblique portion represents each numerical portion. In actual, it is blank (white). The synchronous mark 32 is as large as about 5 mm×5 mm. It is somewhat larger than the other marks for preventing an error caused in reading the marks and an effect of noise. The marks are printed somewhat apart from the edge of the sheet in order that the marks can be precisely read wherever on the plate 5 the printed-out sheet is placed.

After replacing the memory board, the image informations representative of the adjusting values on the printed-out sheet 31 are read by the scanning unit 1 and the read image informations are written in the image RAM 23a. Then, the read image informations are converted to electrical signals indicative of the adjusting values and the converted electrical signals are stored in the work RAM 23b of the new memory board. In this embodiment, the resolution of the image processing system is assumed as 16 dots per one millimeter (or 16 pixels per one millimeter).

Figure 4:
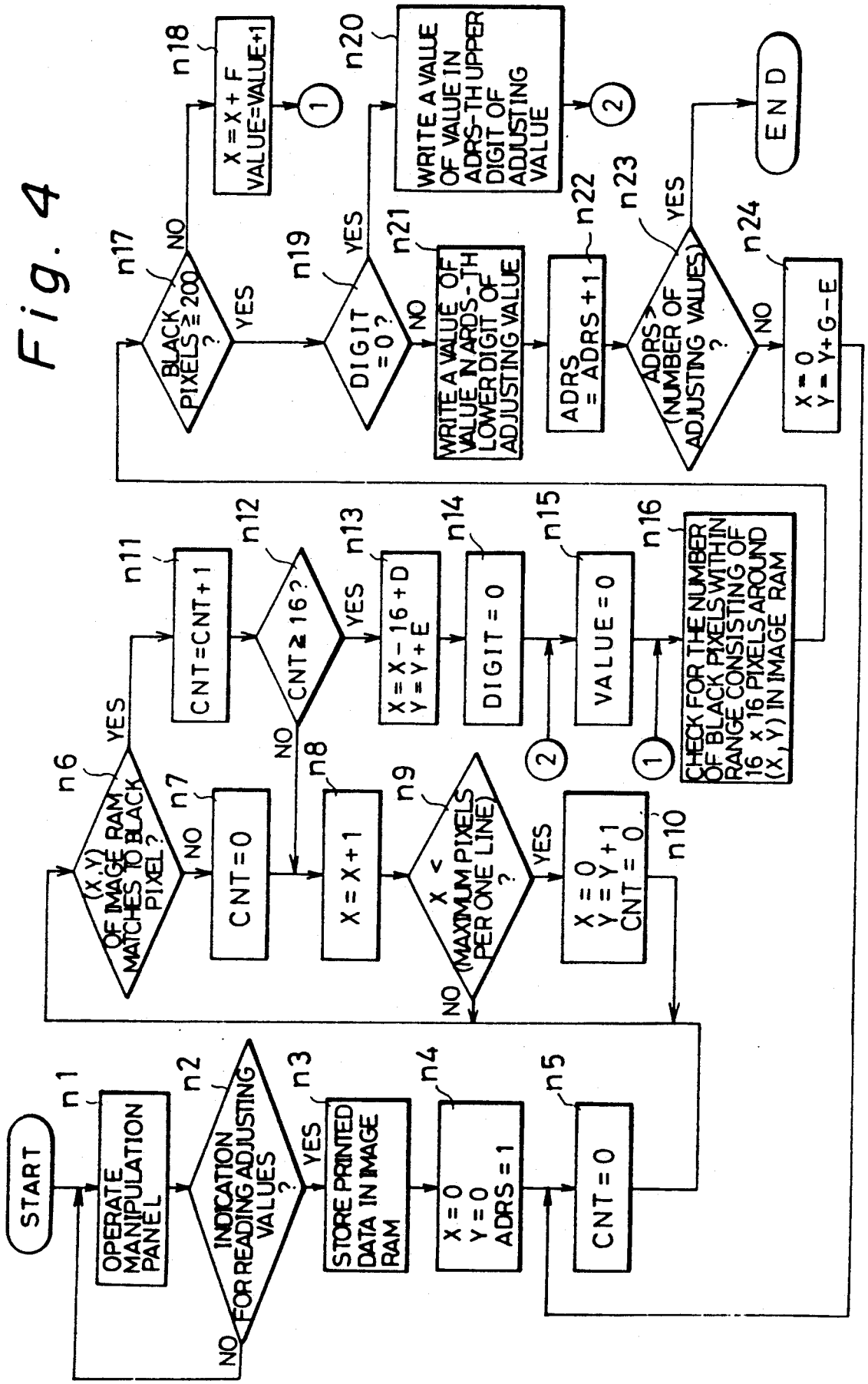
FIG. 4 is a flowchart showing procedure of reproducing data of adjusting values in a data processing apparatus according to the invention.

FIG. 4 is a flowchart showing the procedure performed after reading the image informations on printed-out sheet 31.

In response to an indication that the image informations representative of the adjusting values should be read by the operation of the manipulation panel, the scanning unit 1 reads the image informations on the printed-out sheet and sends the read image informations to the image RAM 23a (step n1→n2→n3).

Upon completion of reading the image informations representative of the adjusting values, the data-reproducing process, that is, the process of converting the read image informations representative of the adjusting values to electrical signals indicative of the adjusting values to be stored in the work RAM 23b is started. The sequence of printing the image informations of the adjusting values and reading them is pre-defined, for example, in a manner that the first is a charging voltage, the second is a bias voltage for development, and so forth. According to the sequence, the printing and data-reproducing processes are performed. In printing the marks and reproducing the adjusting values, the number of the adjusting values is represented by "ADRS". At first, "ADRS" is assumed as "1" and the pixel coordinate (X, Y) is assumed as (X, Y)=(0, 0). Then, the first adjusting value is started to be reproduced (step n4). The first reproducing step of the adjusting value is to make sure the position of the synchronous mark 32a. The first step is such that when a counter CNT counts a predetermined number of black pixels, it is determined that the synchronous mark exists. Concretely, the counter CNT is reset and it is determined that the pixel located at the coordinate (X, Y) is black or white (step n5→n6). The scanning continues until the number of the black pixels reach a predetermined number (16) as adding the coordinate in the X-direction and Y-direction one by one as far as the white pixels are scanned (step n7→n8→n9→n10). By continuing the scanning until the number of the black pixels reach the predetermined number, it is judged whether the synchronous mark exists or not. If not, the scanned black pixels result from noises (step n11→n12). If the synchronous mark 32a exists, the process goes to a step n13 at which the adjusting value is read.

Turning to FIG. 3, it is assumed that A is the black pixel located on the synchronous mark 32a and detected for the first time, C is a center pixel of the numerical portion 35a representing a "0" column of the upper digit, C' is a center pixel of the numerical portion 35b representing a "1" column of the upper digit, and CΔ is a center pixel of the numerical portion 36a representing a "0" column of the lower digit. Further, it is assumed that D is the number of pixels ranged in the X-direction from the A to the C pixel, E is the number of pixels ranged in the Y-direction, and F is the number of pixels ranged in the X-direction from the numerical portions 35a to 35b. The number of pixels ranged from the C to the C" pixel is equal to "F×10". G is assumed to be the number of pixels ranged in the Y-direction from the A pixel to the B pixel located a little before the next synchronous mark 32b. The scanning of the second adjusting value is started from the coordinate (O, B).

Based on the foregoing assumption, the subsequent process is described. At a step n14, "DIGIT" represents an upper digit if it is 0 and a lower digit if it is 1. At a step n15, "VALUE" represents a marked numerical value. The "VALUE" is incremented one by one from 0.

At a step n13, the coordinate of the C pixel of the upper digit is obtained on the A pixel as a reference. Then, it is determined whether each pixel is black or white within a predetermined range spread around the center of the C pixel, for example, within the range consisting of 16×16 pixels. If 200 or more black pixels are found within the range consisting of the 16×16 pixels, the numerical portion 35a is determined to be marked (step n14→n15→n16→n17). Since the determination is done if 200 or more black pixels are found, the adverse effect of noises can be prevented when printing out the image informations representative of the adjusting values on the sheet or reading them. If the numerical portion is determined to be marked, the numerical value "VALUE" of the numerical portion having the C pixel as the center is written in a predetermined area included in the work RAM (at a step n20 or n21). In this embodiment (see FIG. 3), the numerical portion is not marked. Then, moving to the next numerical portion having the C' pixel as the center (step n18), it is determined whether each pixel is black or white within the range consisting of the 16×16 pixels (step n16→n17). This scanning operation continues until it finds out a marked numerical portion. If it is found out, the numerical value matching to it is written in the predetermined area of the work RAM (step n20 or n21). Upon completion of finding the marked numerical portion of the upper digit, the scanning operation moves to the C" pixel included in the lower digit, where the numerical portions corresponding to the lower digit are determined like those of the upper digit.

With the foregoing process, the upper digit and the lower digit of one adjusting value are converted to electrical signals and they are written in the work RAM 23b. Then, the next adjusting value is started to be reproduced (step n22→n23). The scanning operation moves to the B pixel along the Y coordinate. Based on the B pixel, the same reproducing process is started (step n24→n5→. . . ).

As a result, the adjusting values are reproduced and then are stored in the work RAM 23b.

The method of printing the data of adjusting values on the sheet and reading them may employ another method.

Many widely different embodiments of the present invention may be constructed without departing from the spirit and scope of the present invention. It should be understood that the present invention is not limited to the specific embodiments described in the specification, except as defined in the appended claims.

What is claimed is:

1. A data processing apparatus provided in a copying machine which is used when a first memory for storing electrical signals indicative of adjusting values needed in operation of said copying machine is replaced by a second memory, said data processing apparatus comprising:
    means for printing-out on a sheet image informations representative of the adjusting values stored in said first memory;
    means for reading said image informations on said sheet; and
    means for converting the read image informations to electrical signals indicative of adjusting values and for storing the converted electrical signals in said second memory.

2. A data processing apparatus according to claim 1, wherein said printing-out means is formed to print out said image informations on said sheet by two-digit decimal notation.

3. A data processing apparatus according to claim 2, wherein said printing-out means is formed to print out said image informations on said sheet which have a format composed of synchronous marks, upper-digit numerical portions, and lower-digit numerical portions ranged horizontally, that is, in the X-direction, each of said numerical portions having 0 to 9 numerical value blanks, and the same number of formats as that of said image informations are ranged horizontally, that is, in the Y-direction.

4. A data processing apparatus according to claim 3, wherein said synchronous marks are formed to be larger than said upper-digit and lower-digit numerical portions.

5. A data processing apparatus according to claim 4, wherein said synchronous marks are formed to be as large as 5 mm×5 mm.

6. A data processing apparatus according to claim 1, wherein said adjusting values contain a charging voltage of a photoconductor included in said copying machine and a bias voltage for development.

7. A data processing apparatus according to claim 1, wherein said reading means comprises a scanning unit.

8. A data processing apparatus according to claim 7, wherein said scanning unit has a resolution of 16 dot per one millimeter.

9. A data processing apparatus according to claim 1, wherein said first memory is consisted of a RAM.

10. A data processing apparatus according to claim 1, wherein said second memory is consisted of a RAM.

* * * * *